(12) United States Patent
Buss

(10) Patent No.: US 10,155,485 B2
(45) Date of Patent: Dec. 18, 2018

(54) DEVICE FOR CAPTURING IMAGES OF AN OUTER AREA OF A MOTOR VEHICLE

(71) Applicant: HUF HÜLSBECK & FÜRST GMBH & CO. KG, Velbert (DE)

(72) Inventor: Wolfgang Buss, Solingen (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 0 days.

(21) Appl. No.: 15/572,084

(22) PCT Filed: Apr. 20, 2016

(86) PCT No.: PCT/EP2016/058726
§ 371 (c)(1),
(2) Date: Nov. 6, 2017

(87) PCT Pub. No.: WO2016/177577
PCT Pub. Date: Nov. 10, 2016

(65) Prior Publication Data
US 2018/0141501 A1 May 24, 2018

(30) Foreign Application Priority Data
May 6, 2015 (DE) .......................... 10 2015 107 070

(51) Int. Cl.
*B60R 11/00* (2006.01)
*B60R 11/04* (2006.01)

(52) U.S. Cl.
CPC ......... *B60R 11/04* (2013.01); *B60R 2011/004* (2013.01); *B60R 2011/0082* (2013.01);
(Continued)

(58) Field of Classification Search
CPC ...................................................... B60R 11/04
See application file for complete search history.

(56) References Cited

U.S. PATENT DOCUMENTS

| | | | |
|---|---|---|---|
| 7,891,886 B2 * | 2/2011 | Schuetz | B60R 11/04 348/148 |
| 8,821,043 B2 * | 9/2014 | Schutz | B60R 11/04 396/419 |
| 8,988,526 B2 * | 3/2015 | Schutz | B60R 11/04 348/148 |

FOREIGN PATENT DOCUMENTS

| | | |
|---|---|---|
| DE | 10 2007 052 402 A1 | 5/2009 |
| DE | 10 2009 008 281 A1 | 8/2010 |

(Continued)

OTHER PUBLICATIONS

International Preliminary Report on Patentability and Written Opinion of International Application No. PCT/EP2016/058726 dated Nov. 7, 2017 and English Translation, 11 pages.
(Continued)

*Primary Examiner* — Noam Reisner
(74) *Attorney, Agent, or Firm* — Fay Sharpe LLP

(57) ABSTRACT

A device for capturing images of the outer area of a motor vehicle includes a camera, a carrier, a cover and a movement element. The movement element is rotatably mounted on a first rotational axis of the carrier and a transmission element is rotatably mounted on a second rotational axis of the carrier. The transmission element is integrally molded onto the cover. The movement element and the transmission element are connected to one another via a cover connection. When the movement element moves from a standby position into an intermediate position, the cover is moved from a closed position into an open position. The movement element and the camera are connected to one another via a camera connection. Movement of the movement element from the intermediate position into an operating position keeps the cover in the open position and moves the camera from a rest position into an active position.

11 Claims, 3 Drawing Sheets

(52) U.S. Cl.
CPC ............. *B60R 2011/0089* (2013.01); *B60R 2011/0094* (2013.01)

(56) References Cited

FOREIGN PATENT DOCUMENTS

| | | |
|---|---|---|
| DE | 10 2009 015 610 A1 | 10/2010 |
| DE | 10 2010 060 573 A1 | 5/2012 |
| DE | 10 2012 025 626 A1 | 4/2014 |
| DE | 10 2013 103 930 A1 | 10/2014 |
| WO | WO 2011/154290 A2 | 12/2011 |

OTHER PUBLICATIONS

International Search Report of International Application No. PCT/EP2016/058726 dated Jun. 27, 2016, 6 pages.

\* cited by examiner

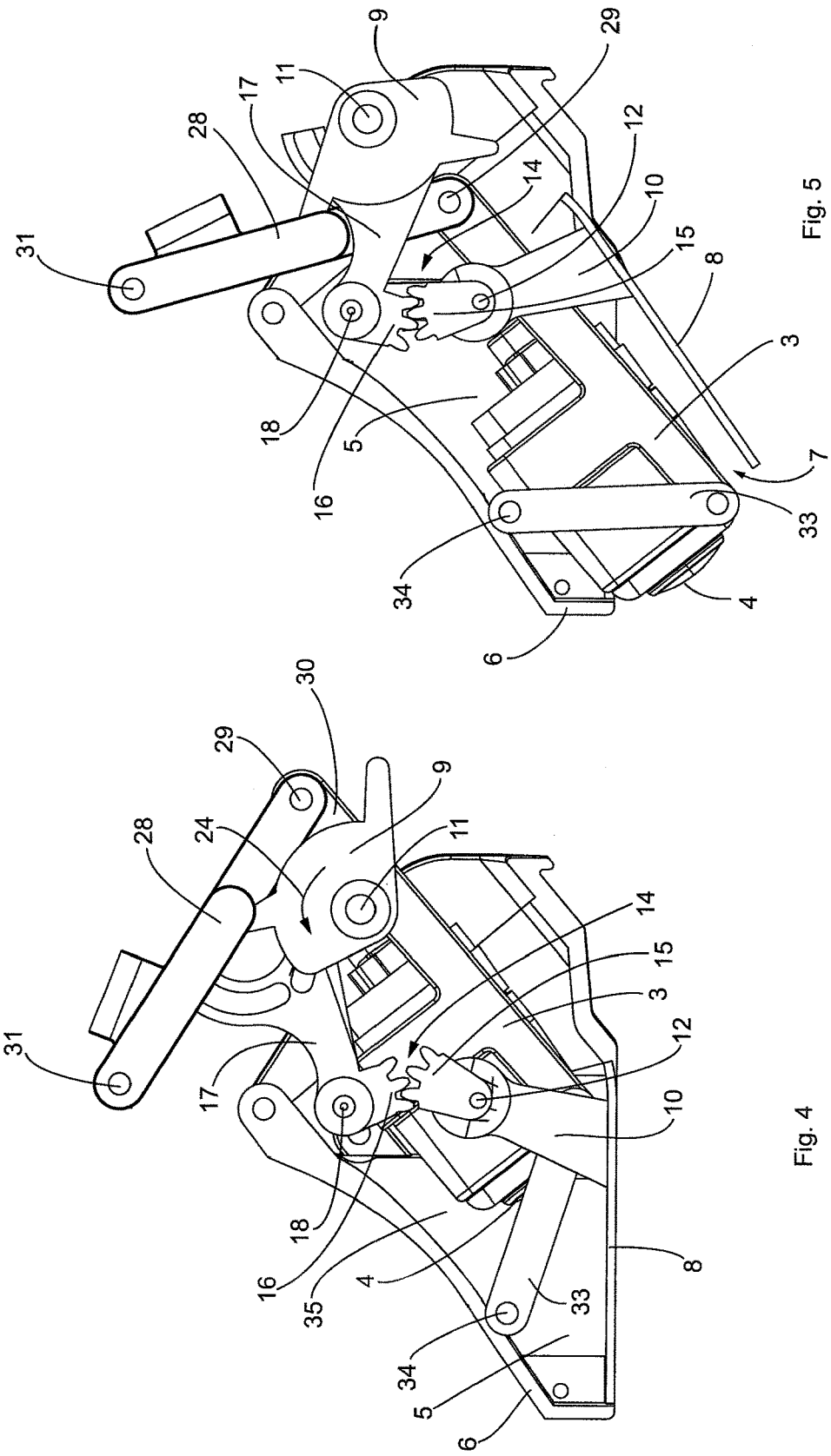

DEVICE FOR CAPTURING IMAGES OF AN OUTER AREA OF A MOTOR VEHICLE

BACKGROUND

The invention relates to a device for recording images of the area outside a motor vehicle, and comprises a camera unit, which has a lens, a mounting assembly, which has a through hole, and in which the camera unit is accommodated such that it can move between a retracted standby position in the mounting assembly and an active position, in which the camera unit protrudes at least partially out of the through hole in the mounting assembly, and a cover element, which is designed such that it can move between a closed position, closing the through hole in the mounting assembly, and an open position.

Devices with a camera unit serving to record images of the area outside a motor vehicle are already known from the prior art. These devices comprise a camera unit, which is accommodated in a housing such that it can move between a standby position and an active position. By way of example, such camera units are used in the field of parking assistance for motor vehicles. When, for example, the reverse gear of a motor vehicle is engaged, the camera unit moves from the standby position into the active position, wherein the camera unit protrudes at least partially out of the housing. As a result, the area behind the motor vehicle is recorded visually by the camera unit, and displayed on a monitor for the driver of the motor vehicle. When driving in reverse is completed, and the reverse gear is disengaged by the driver, the camera can pivot from the active position back into the standby position.

In order to protect the camera unit from dirt, at least in the standby position, a cover element is provided, by means of which the opening, through which the camera unit protrudes out of the housing of the camera unit, can be closed when in the standby position. Consequently, in the transition from the standby position into the active position of the camera unit, the cover element must simultaneously be moved between a closed position and an open position.

A device of the type indicated above is known, for example, from DE 10 2012 025 626 A1. With this known device, in order to accommodate a camera unit, a moving carriage is placed in a housing, to which the camera unit can be attached. The carriage is driven by a gearing, which includes swing elements, connected in an articulated manner to the carriage. Each swing element can pivot about a stationary axis on the housing. The disadvantage with this prior art is that the cover element is pivotally supported on the outer surface of the housing, and a corresponding space requirement on the outer surface of the housing must be available when it is pivoted upward, having a negative effect on the compactness of the device, which includes a camera unit and cover element.

Furthermore, a device with a camera is known from DE 10 2007 052 402, which serves to record images of the area outside a motor vehicle. The movement of the camera unit disclosed therein and the movement of the cover element disclosed therein in relation to the camera unit comprise numerous movement steps, such that a complex kinematic activation of the cover element is required. In particular, the device disclosed herein requires a significant installation space for the movement of the camera unit and the cover element.

The object of the invention is to create solution that provides a device with a camera unit and a cover element in a structurally simple manner and inexpensively, which requires little installation space, and which is simultaneously distinguished by a movement path that has been kept short, and consequently by a quick activation.

BRIEF DESCRIPTION

This object shall be achieved according to the invention by a device for recording images of the area outside a motor vehicle having the features of Claim 1.

The device according to the invention is suitable for recording the area outside a motor vehicle, and comprises a camera unit that has a lens for recording images of the area outside a motor vehicle, a mounting assembly, which has a through hole, and in which the camera unit is accommodated such that it can move between a standby position, in which it is retracted into the mounting assembly, and an active position, in which the camera unit protrudes, at least in part, out of the through hole in the mounting assembly, a cover element, which is designed such that it can move between a closed position that closes the through hole in the mounting assembly, and an open position, and a movement element, which can move from a standby position via an intermediate position into an operating position. The movement element is rotatably supported on a rotational axis of the mounting component, wherein a transmission element is formed on the cover element, which is rotatably supported on a second rotational axis of the mounting component. The movement element and the transmission element are connected to one another by a cover connection that moves the cover element from the closed position into the open position when the movement element moves from the standby position into the intermediate position. The movement element and the camera unit are furthermore connected to one another via a camera connection that retains the cover element in the open position, and moves the camera unit from the standby position into the active position when the movement element moves from the intermediate position into the operating position.

Advantageous and functional designs and further developments of the invention can be derived from the dependent Claims.

A device that has a camera unit for recording images of the area outside a motor vehicle is provided by the invention, distinguished by a functional construction, and exhibiting a cost-effective construction. According to the invention, a two-step mechanism is provided for extending the camera unit, distinguished by a cover connection and a camera connection, each of which includes the movement element, which ensures that the cover element is moved into its open position when the movement element moves from its standby position into its intermediate position in a first movement step. In the subsequent second movement step, the movement element ensures that the cover element is retained in its open position by means of the cover connection and that the camera unit is moved from its standby position into the active position, when the movement element moves from the intermediate position into the standby position. Regardless of whether the movement element rotates about the first rotational axis in the same rotational direction during its movement from the standby position into the operating position via the intermediate position, the cover element does not continue to move during the movement from the intermediate position into the operating position, but instead is retained in its position in a fixed manner. The connection for moving the cover element and the camera unit via the movement element results in a pivotal movement of the camera unit as well as the cover element, with a compact movement curvature in a tight space. Consequently, the cover element and the camera unit are guided by the two connections (cover connection and camera connection) such that the space for accommodating and moving the camera unit can be reduced to a minimum, and as a result, the device has a simple construction requiring little structural space. Because of the compact movement curvature of the camera unit, the time period required for the extending of the camera unit can be reduced by the invention to a minimum.

There is a simple and cost-effective possibility for a structural implementation of the cover connection in the design of the invention, in that the cover connection is formed by a first gearwheel segment, formed on the transmission element, and a second gearwheel segment that is engaged in the first gearwheel segment.

In a further design of the cover connection, the invention provides that the second gearwheel segment is formed on an actuating element that is rotatably supported on a third rotational axis of the mounting component, which is moveably coupled to the movement element via a movement mechanism, and can rotate about the third rotational axis between a home position and a retention position. A more complicated construction is required, however, with a third rotational axis. As a result, there is the advantage that it is possible to pivot the cover element in particular in a very tight space, such that the installation space for the device as a whole can be kept small. The actuating element is disposed in a home position when the movement element is in the standby position, and is disposed in a retention position when the movement element is in the intermediate position as well as in the operating position.

It is advantageous thereby, in terms of an advantageous and simple construction, when the movement mechanism comprises a first pin, which is formed on the movement element at a spacing to the first rotational axis, and a first guide recess, which is formed in the actuating element, wherein, when the movement element moves from the standby position into the intermediate position, the first pin is disposed in the first guide recess, pushing the actuating element from the home position into the retention position. The first pin thus ensures, when it interacts with the first guide recess, that the cover element is pushed by the movement mechanism into the open position in the first movement step of the movement element.

While the movement element continues to rotate about the first rotational axis in order to move the camera unit into its active position, the cover element, however, is already in the open position, and it must therefore be ensured that when the movement element rotates further about the first rotational axis, the cover element does not continue to move. For this, the invention provides that the movement mechanism comprises a second pin in a further design of the device, which is formed on the movement element at a spacing to the first rotational axis, and a second guide recess, which is formed in the actuating element, wherein the second pin is disposed such that it moves in the second guide recess, and retains the actuating element in the retention position when the movement element moves from the intermediate position into the operating position. In particular, the first pin is no longer in the first guide recess after the intermediate position, such that only the second pin and the second guide recess form the connection between the actuating element and the movement element.

Regardless of whether the second pin moves inside the second guide recess during the movement of the movement element, the movement of the movement element does not cause the actuating element to move, such that the curvature radius of the second guide recess is identical to the radius with which the second pin is rotated in relation to the first rotational axis $11$. As a result, the design of the invention provides that the curvature radii of the first guide recess and the second guide recess differ. As a result, although the radii of the two pins are identical, it is possible for a pin to cause a rotational movement of the actuating element about the third rotational axis through its movement in a guide recess, while the movement of the other pin in the other guide recess does not cause the actuating element to rotate, and basically does not force the actuating element to move or rotate, due to the different curvature radii of the two guide recesses.

It is then advantageous in the design of the invention when the camera connection is formed by a first lever arm, formed on the movement element and protruding radially outward, and a driving pin formed on a lever element, wherein the lever element is rotatably connected to the camera unit via a pivot joint connection.

For a compact guidance of the camera unit, the invention provides that the camera unit is supported at its longitudinal end facing away from the lens via the lever element in a further design, such that it can rotate about a fourth rotational axis of the mounting component.

With regard to the two-step movement, in which the cover element is moved into the open position in a first step, and subsequently, the camera unit is moved into the active position in a second step, it is of particular advantage when the first lever arm bears on the driving pin when the movement element is in the intermediate position, and when moving into the operating position, pushes the driving pin, such that the pivoting of the lever element about the fourth rotational axis moves the camera unit from the standby position into the active position.

In a further design, the invention provides that the camera connection comprises a second lever arm and the driving pin is disposed between the first and second lever arms, wherein the second lever arm bears on the driving pin, moving the camera unit back into the standby position when the movement element moves from the operating position into the standby position. One of the two lever arms of the movement element bears on the driving pin, depending on the movement of the movement element, and ensures that, depending on the direction of rotation of the lever arm in question, the camera unit moves, either from the standby position into the active position, or from the active position into the standby position.

In order to move the camera in an even more compact and space-saving manner, it is of particular advantage when the camera unit is supported on a pivotal axis of the mounting component at its longitudinal end at which the lens is located, via a pivotal element. In this manner, the movement of the camera unit is guided via the pivotal element and the lever element.

Lastly, the invention provides in a further design that the movement element rotates about the first rotational axis when it moves from the standby position into the operating position, and the cover element rotates about the second rotational axis when it moves from the closed position into the open position.

It should be noted that, as set forth in the invention, a mounting assembly is understood to mean both a separate housing, in which the assembly according to the invention, having a camera unit, cover element and movement mechanism, is accommodated and which can be installed in the vehicle body, as well as a recess in the vehicle body, in which the assembly according to the invention, having the camera unit, cover element and movement mechanism can be inserted and installed. The object of the mounting assembly is to function as a means for accommodating the assembly, which includes the camera unit, cover element, and movement mechanism.

Likewise as set forth in the invention, a rotational axis is to be understood to mean an axis on which something mounted thereon can rotate. This does not need to be an axle in the manner of a rod-shaped element or a drive axle. The rotational axes in the present invention can also be rotational or articulation points, on which an element is supported or attached such that it can rotate over a point. Furthermore, the pivotal element of the present invention can be a pair of arms, thus a two-armed or double-armed element, on both sides of which the camera unit is disposed, and on the end of which the rod-shaped rotational axes are disposed, running parallel to one another.

It is to be understood that the features specified above and still to be explained below can be used not only in the respective given combinations, but also in other combinations or in and of themselves, without abandoning the scope of the present invention. The scope of the invention is defined only by the Claims.

BRIEF DESCRIPTION OF THE DRAWINGS

Further details, features and advantages of the subject matter of the invention can be derived from the following description in conjunction with the drawings in which a preferred exemplary embodiment of the invention is depicted by way of example. Therein:

FIG. 4 shows the device according to the invention in a side view, with the camera unit disposed in its standby position, FIG. 5 shows the device according to the invention in a further side view, with the camera unit disposed in its active position.

DETAILED DESCRIPTION

Figure 1:
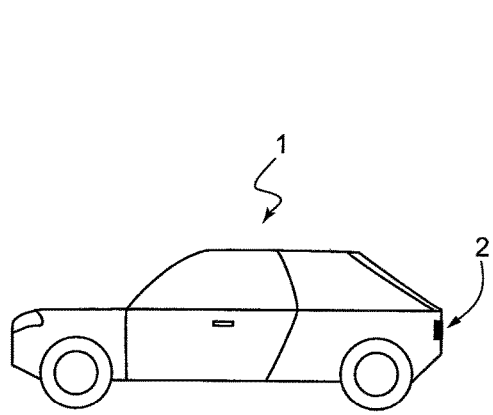
FIG. 1 shows a schematic illustration of a motor vehicle, which has a device according to the invention, indicated by way of example.
Figure 2:
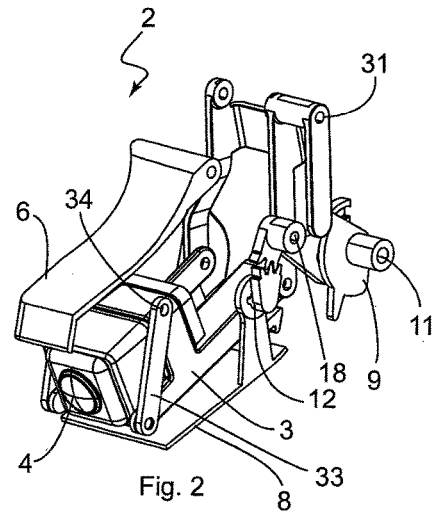
FIG. 2 shows a perspective illustration of a camera unit, a cover element, and a movement mechanism of the device or assembly according to the invention.
Figure 3:
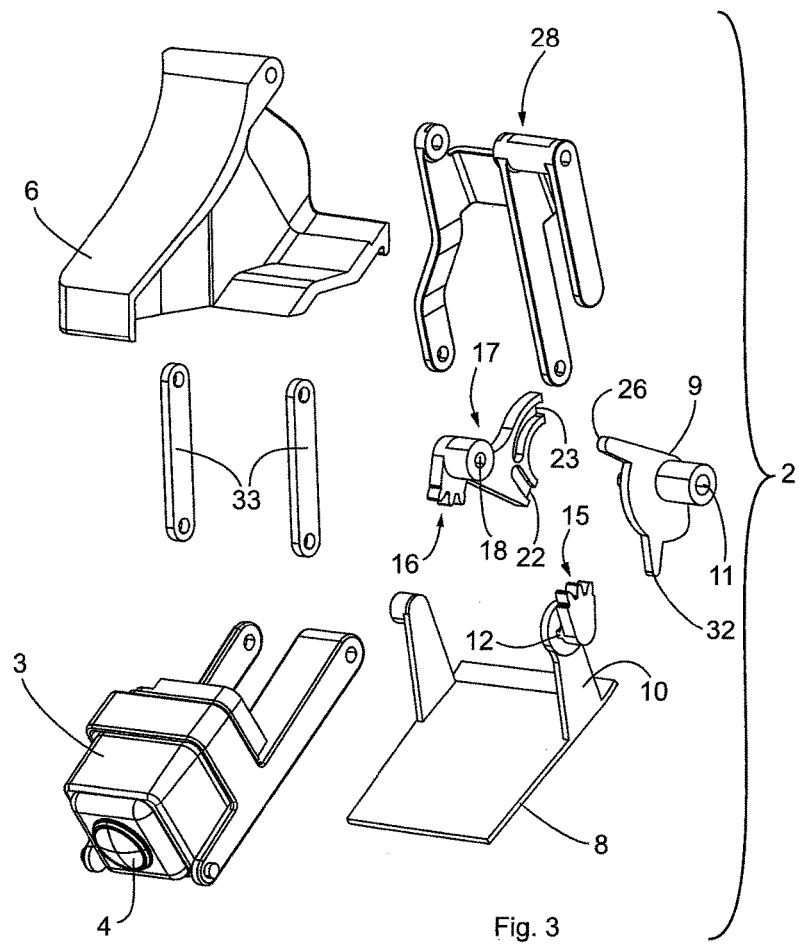
FIG. 3 shows a perspective exploded view of the device or assembly according to invention from FIG. 2.
Figure 6:
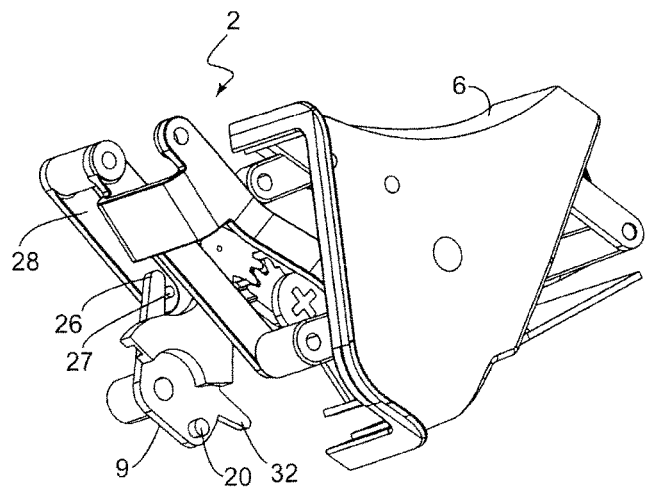
FIG. 6 shows a perspective rear view of the assembly according to the invention.
Figure 7:
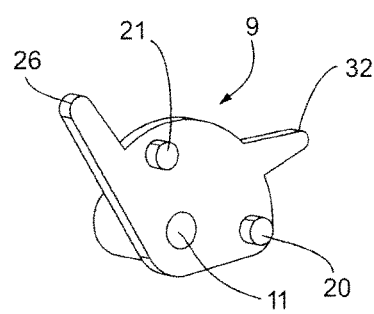
FIG. 7 shows another perspective view of a movement element of the device according to the invention.

FIG. 1 shows a side view of a motor vehicle 1, which has an embodiment of a device 2 according to the invention on its rear or on its bumper. As FIG. 2 shows, the device 2 comprises a camera unit 3, serving to record images of the area outside the motor vehicle 1, and equipped with a lens 4 for this purpose. The camera unit 3 is accommodated in a recess 5 of a mounting assembly 6 in FIGS. 4 and 5. The camera unit 3 is accommodated thereby with a mechanism, which shall be explained further below, such that it can move between a standby position (see FIG. 4) and an active position (see FIG. 5). In the standby position, the camera unit 3 is retracted into the mounting assembly 6, and disposed such that it is protected in the recess 5 of the mounting assembly 6, while in contrast, the camera unit 3 protrudes outward, at least in part, from a through hole 7 of the mounting assembly 6 when in the active position, and projects downward from the through hole 7. When the camera unit 3 is in the standby position, a cover element 8 shown in the FIGS. 2 to 6 closes the through hole 7 of the mounting assembly 6, which can be a part of the body of the motor vehicle 1, or a separate housing that can be installed in the body of the motor vehicle 1. The cover element 8 itself is formed such that it can moved between a closed position (see FIG. 4), in which it closes the through hole 7 of the mounting assembly 6, and an open position (see FIG. 5), in which the cover element exposes the through hole 7 for the camera unit 3. The camera unit 3 is protected against environmental effects such as rain, dust, sunlight, dirt and potential theft by the cover element 8.

As specified above, the activation of the camera unit 3 takes place in two steps, wherein the cover element 8 is moved into its open position in a first step, and the camera unit 3 is moved into its active position in a second step, which takes place subsequently to the first step. In order to move the cover element 8 from its closed position (see FIG. 4) into its open position (see FIG. 5), the device or assembly 2 comprises a movement element 9, which can be moved from a standby position (see FIG. 4 or 9) into an operating position (see FIG. 5 or 10) via an intermediate position, and a transmission element 10, which is formed on the cover element 8. The movement element 9 is rotatably supported on a first rotational axis 11 of the mounting component 6, while in contrast, the transmission element 10 is rotatably supported on a second rotational axis 12 of the mounting component 6. In order to then move the cover element 8, the movement element 9 and the transmission element 10 are connected to one another in the device or assembly 2 according to the invention via a cover connection 14 (see, by way of example, FIG. 4). The cover connection 14 is designed thereby such that, when the movement element 9 is moved from the standby position into the intermediate position, the cover element 8 moves from the closed position into the open position.

The cover connection 14 is formed by a first gearwheel segment 15 and a second gearwheel segment 16, which are engaged in one another (see, by way of example, FIGS. 4 and 5). The first gearwheel segment 15 is formed thereby on the transmission element 10, while in contrast, the second gearwheel segment 16 is formed on an actuating element 17. The actuating element 17 is rotatably supported on a third rotational axis 18 of the mounting component 6. Furthermore, the actuating element 17 is moveably coupled to the movement element 9 via a movement mechanism 19 (see FIGS. 9 and 10) and is supported by means of the movement mechanism, such that it can rotate about the third rotational axis 18 between a home position (see FIG. 9) and a retention position (see FIG. 10). In particular, the actuating element 17 is disposed in home position when the movement element 9 is in the standby position, while in contrast, the actuating element 17 is disposed in the retention position when the movement element 9 is in the intermediate position as well as in the operating position.

Figure 9:
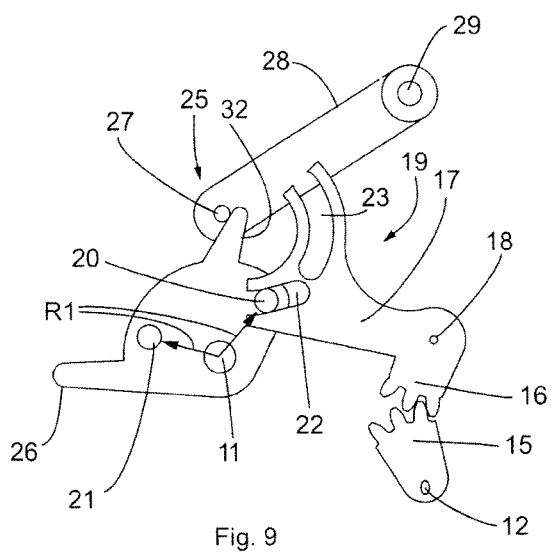
FIG. 9 shows a sectional side view of the movement mechanism of the device according to the invention, with the camera unit disposed in its standby position.
Figure 10:
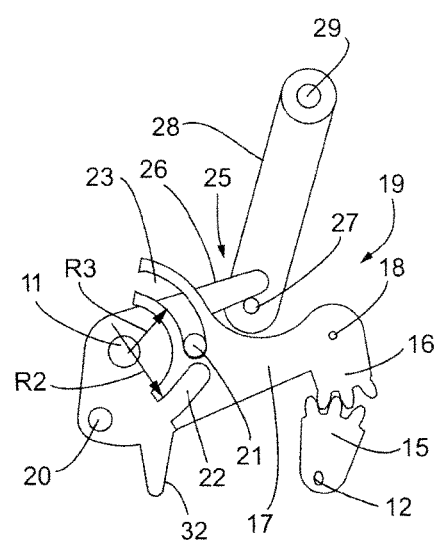
FIG. 10 shows a sectional side view of the movement mechanism of the device according to the invention, with the camera unit disposed in its active position.

The movement mechanism 19 that can be seen in FIGS. 9 and 10 comprises a first pin 20 and a second pin 21, which are formed on the movement element 9 at a spacing to the first rotational axis 11. The two pins 20, 21 are formed on the movement element 9 thereby at a basically identical radius to the first rotational axis 11 (see FIG. 9, by way of example). Furthermore, the movement mechanism 19 comprises a first guide recess 22 and a second guide recess 23, both of which are formed in the actuating element 17. With the movement mechanism 19 formed in this manner, it is then possible, with the movement of the movement element 9 from the standby position into the intermediate position, that the first pin 20 is disposed in the first guide recess 22, pushing the actuating element 17 from the home position into the retention position, while in contrast, when the movement element 9 is moved from the intermediate position into the operating position, the second pin 21 is disposed such that it moves in the second guide recess 23, and retains the actuating element 17 in the retention position. Regardless of whether the second pin 21 moves inside the second guide recess 23 during the movement of the movement element 9, the movement of the movement element 9 does not cause the actuating element 17 to move, because the curvature radius R3 of the second guide recess 23 is the same as the curvature radius R1, with which at least the second pin 21 pivots about the first rotational axis 11. Consequently, the curvature radii R2, R3 (see FIG. 10) of the first guide recess 22 and the second guide recess 23 differ.

Using the structural design of the cover connection 14 and the movement mechanism 19 described above, the cover element 8 is moved from its closed position into its open position. By way of example, the first rotational axis 11 is connected to a drive element, not shown in the figures, and non-rotatably connected to the movement element 9, such that a driven first rotational axis 11 rotates the movement element 9 when it rotates. In reference to FIG. 4, the first rotational axis 11 is rotated counter-clockwise (arrow direction 24), resulting in the movement element 9 rotating in the same direction. In reference to FIG. 9, which is a rear sectional view of FIG. 4, the movement element 9 rotates in the clockwise direction here accordingly. The first pin 21 is disposed thereby in the first guide recess 22, and pivots the actuating element 17 about the third rotational axis 18 when it rotates about the first rotational axis 11, by means of which the second gearwheel segment 16 rotates the first gearwheel segment 15, which is non-rotatably connected to the cover element 8 via the transmission element 10, about the second rotational axis 12, by means of which the cover element 8 is ultimately moved out of its closed position into the open position. Due to the fact that curvature radius R2 is not the same as the radius R1 of the first pin 21, the first pin 21 rotates the actuating element 17 about the third rotational axis 18 when it moves in the first guide recess 22, until the actuating element is moved from the home position shown in FIG. 9 into the retention position shown in FIG. 10. In the retention position, the first pin 20 is then removed from the first guide recess 22, and the second pin 21 enters the second guide recess 23, wherein, at the same time, the movement element moves from its intermediate position into its operating position (see FIG. 10, by way of example). During this movement, the actuating element 17 is retained in its retention position via the movement mechanism 19 described above.

Figure 8:
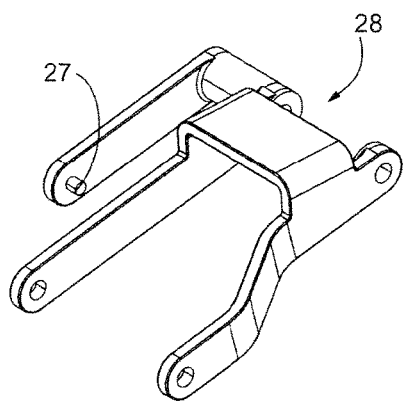
FIG. 8 shows yet another perspective view of a lever element of the device according to the invention.

Accordingly, it is clear from the above explanations that the movement of the movement element 9 from its intermediate position into its operating position has no effect on the cover element 8. Instead, the movement from the intermediate position into the operating position results in the camera unit 3 being moved in a second step from its standby position into the active position, after the cover element 8 (see FIG. 8, by way of example) is moved into its open position. The step-for-step movement, i.e. first the cover element 8 is moved, and then the camera unit 3 is first moved, has the advantage that a smaller drive motor can be used, because it is not necessary to move both components and their movement mechanisms at the same time.

In order to move the camera unit 3 from the standby position into the active position, the movement element 9 and the camera unit 3 are connected to one another by a camera connection 25, which can also be seen, by way of example, in FIGS. 9 and 10. When the movement element 9 moves from the intermediate position into the operating position, the camera connection 25 retains the cover element 8 in the open position, and moves the camera unit 3 from the standby position into the active position. In order to do so, the camera connection 25 comprises a first lever arm 26, formed on the movement element 9 and protruding radially outward from it, and a driving pin 27, formed on a lever element 28 (see FIG. 8, by way of example). The lever element 28 is furthermore rotationally connected to the camera unit 3 via a pivot joint connection 29 (see FIG. 4, 5, 9 or 10, by way of example). As a result, the camera unit 3 is rotatably supported at its longitudinal end 30 facing away from the lens 4 on a fourth rotational axis 31 of the mounting component 6 (see FIG. 4 or 5) via the lever element 28.

In order to then move the camera unit 3 into the open position, the first lever arm 26 of the movement element 9 bears on the driving pin 27 when it moves into the intermediate position. When it moves into the operating position, the first lever arm 26 then pushes the driving pin 27, such that the lever element 28 pivots about the fourth rotational axis 31, by means of which the camera unit 3 moves from the standby position into the active position.

With the opening/activation movement of the device or assembly 2 described above, which takes place in two stages, or in two successive steps, respectively, the movement element 9 rotates about the first rotational axis 11 when it moves from the standby position into the operating position, the cover element 8 rotates about the second rotational axis 12 when it moves from the closed position into the open position, and the camera unit 3 pivots at least about the fourth rotational axis 31 when it moves from the standby position into the active position, and can optionally also pivot about a pivotal axis 34 (see FIG. 4, by way of example).

In order for the camera unit 3 to be able to return to the standby position, the camera connection 25 comprises a second lever arm 32, wherein the driving pin 27 is disposed between the first and second lever arms 26, 32. When the movement element 9 moves from the operating position into the standby position, the second lever arm 32 then bears on the driving pin 27 (see FIG. 9) and pushes the camera unit 3 back into the standby position.

The movement of the camera unit 3 can be made even more compact by a pivot element 33. The pivot element 33 is formed in the manner of a lever arm, and is supported on the pivotal axis 34 of the mounting component 6 in an articulated manner at a first longitudinal end, while in contrast, the other longitudinal end rotatably supports the camera unit 3 at its longitudinal end where the lens 4 is located.

For the invention shown in the exemplary embodiment it is characteristic that the activation of the camera unit 3 takes place in a two-step movement sequence, wherein the cover element 8 is first moved in a first step into it open position, and the camera unit 3 is subsequently moved into its active position in a second step.

In summary, the device 2 according to the invention, more precisely an assembly 2 according to the invention for recording images of the area outside a motor vehicle 1, comprises the camera unit 3 with the lens 4, the mounting assembly 6, which has the through hole 7 and in which the camera unit 3 is accommodated such that it can move between the standby position, in which it is retracted into the mounting assembly 6, and the active position, in which the camera unit 3 protrudes outward, at least in part, from the through hole 7 in the mounting assembly 6, and the cover element 8, which is configured such that it can move between the closed position, closing the through hole 7 of the mounting assembly 6, and the open position. The invention is characterized by the movement element 9, which can move from the standby position into an operating position via the intermediate position. The movement element 9 is rotatably supported thereby on first rotational axis 11 of the mounting component 6, wherein the transmission element 10, rotatably supported on the second rotational axis 12 of the mounting component 6, is formed on the cover element 8. Furthermore, the movement element 9 and the transmission element 10 are connected to one another via the cover connection that moves the cover element 8 from the closed position into the open position when the movement element 9 moves from the standby position into the intermediate position. Lastly, the movement element 9 and the camera unit 3 are connected to one another via the camera connection 25 that retains the cover element 8 in the open position and moves the camera unit 3 from the standby position into the active position when movement element 9 moves from the intermediate position into the operating position.

As a matter of course, invention described above is not limited to the embodiment described and illustrated herein. It is clear that numerous modifications can be made to the embodiment depicted in the drawings, which are obvious to the person skilled in the art in accordance with the intended use, without abandoning the scope of the invention. Everything contained in the description and/or depicted in the drawings belongs to the invention, including that which is obvious to the person skilled in the art, deviating from the concrete exemplary embodiments.

The invention claimed is:

1. A device for recording images of the area outside a motor vehicle, comprising a camera unit with a lens, a mounting component, which has a through hole and in which the camera unit is accommodated such that it is configured to move between a retracted position in the mounting component and an active position, in which the camera unit protrudes at least in part out of the through hole in the mounting component, a cover element, which is configured such that it can move between a closed position, in which the cover element closes the through hole of the mounting component, and an open position, in which the cover element exposes the through hole for the camera unit, and a movement element, which is configured to move from a standby position into an operating position via an intermediate position,
    wherein the movement element is rotatably supported on a first rotational axis of the mounting component, and a transmission element rotatably supported on a second rotational axis of the mounting component is formed on the cover element,
    wherein the movement element and the transmission element are connected to one another via a cover connection that moves the cover element from the closed position into the open position when the movement element moves from the standby position into the intermediate position,
    wherein the camera unit is still disposed in its retracted position when the movement element moves from the standby position into the intermediate position,
    wherein an actuating element is movably coupled to the movement element such that the movement element pushes the cover element from the closed position into the open position when the movement element moves from the standby position into the intermediate position,
    wherein the movement element and the camera unit are connected to one another via a camera connection that retains the cover element in the open position and moves the camera unit from the retracted position into the active position when the movement element moves from the intermediate position into the operating position,
    wherein a lever element is rotatably connected with the camera unit and the movement element pivots the lever element such that the camera unit is moved from the retracted position into the active position when the movement element moves from the intermediate position into the active position, and
    wherein the camera unit is rotatably supported at its longitudinal end on a pivotal axis of the mounting component via a pivot element, the longitudinal end being the same end on which the lens is supported.

2. The device according to claim 1, wherein the cover connection is formed by a first gearwheel segment, formed on the transmission element, and a second gearwheel segment engaged with the first gearwheel segment.

3. The device according to claim 2, wherein the second gearwheel segment is formed on the actuating element rotatably supported on a third rotational axis of the mounting component, which is moveably coupled to the movement element via a movement mechanism, and is configured to rotate between a home position and a retention position about the third rotational axis.

4. The device according to claim 3, wherein the movement mechanism comprises a first pin, which is formed on the movement element at a spacing to the first rotational axis, and a first guide recess, formed in the actuating element, wherein the first pin is disposed in the first guide recess when the movement element moves from the standby position into the intermediate position, pushing the first pin in the first guide recess of the actuating element out of a home position into a retention position.

5. The device according to claim 4, wherein the movement mechanism comprises a second pin, which is formed on the movement element at a spacing to the first rotational axis, and a second guide recess, formed in the actuating element, wherein the second pin is disposed such that it moves in the second guide recess when the movement element moves from the intermediate position into the operating position, and retains the actuating element in the retention position.

6. The device according to claim 5, wherein curvature radii of the first guide recess and the second guide recess differ.

7. The device according to claim 1, wherein the camera connection is formed by a first lever arm formed on the movement element and protruding radially outward, and a driving pin formed on the lever element, wherein the lever element is rotatably connected to the camera unit via a pivot joint connection.

8. The device according to claim 7, wherein the camera unit is rotatably supported on a fourth rotational axis of the mounting component via the lever element at its longitudinal end facing away from the lens.

9. The device according to claim 8, wherein the first lever arm bears on the driving pin when the movement element is in the intermediate position, and pushes the driving pin when it moves into the operating position, such that the pivoting of the lever element about the fourth rotational axis moves the camera unit from the standby position into the active position.

10. The device according to claim 7, wherein the camera connection comprises a second lever arm, and the driving pin is disposed between the first and second lever arms, wherein the second lever arm bears on the driving pin when the movement element moves from the operating position into the standby position, moving the camera unit back into the standby position.

11. The device according to claim 1, wherein the movement element rotates about the first rotational axis when it moves from the standby position into the operating position, and the cover element rotates about the second rotational axis when it moves from the closed position into the open position.

* * * * *